United States Patent
Il

(10) Patent No.: US 10,847,999 B2
(45) Date of Patent: Nov. 24, 2020

(54) WIRELESS POWER RECEIVER, WIRELESS POWER TRANSMISSION SYSTEM USING THE SAME, AND RECTIFIER

(71) Applicant: TDK Corporation, Tokyo (JP)

(72) Inventor: Akihiro Il, Tokyo (JP)

(73) Assignee: TDK CORPORATION, Tokyo (JP)

( * ) Notice: Subject to any disclaimer, the term of this patent is extended or adjusted under 35 U.S.C. 154(b) by 203 days.

(21) Appl. No.: 15/830,523

(22) Filed: Dec. 4, 2017

(65) Prior Publication Data

US 2018/0159380 A1 Jun. 7, 2018

(30) Foreign Application Priority Data

Dec. 7, 2016 (JP) .................. 2016-237639

(51) Int. Cl.
| | |
|---|---|
| *H02J 50/12* | (2016.01) |
| *H04B 5/00* | (2006.01) |
| *H02M 1/12* | (2006.01) |
| *H02M 7/06* | (2006.01) |
| *H01F 38/14* | (2006.01) |
| *H02J 7/02* | (2016.01) |

(52) U.S. Cl.
CPC ............... *H02J 50/12* (2016.02); *H02M 1/12* (2013.01); *H02M 7/06* (2013.01); *H04B 5/0037* (2013.01); *H01F 38/14* (2013.01); *H02J 7/025* (2013.01)

(58) Field of Classification Search
CPC . H02J 50/12; H02M 1/12; H02M 7/06; H04B 5/0037; H01F 38/14

USPC ......................................... 307/104
See application file for complete search history.

(56) References Cited

U.S. PATENT DOCUMENTS

| | | | | |
|---|---|---|---|---|
| 2005/0057210 | A1* | 3/2005 | Ueda ............... | H02M 5/458 318/801 |
| 2009/0096437 | A1* | 4/2009 | Wei ................. | H02M 1/10 323/299 |
| 2009/0290389 | A1* | 11/2009 | Ueno ............... | H02M 3/337 363/21.02 |
| 2014/0152117 | A1* | 6/2014 | Sankar ............. | H03H 7/40 307/104 |

(Continued)

FOREIGN PATENT DOCUMENTS

WO 2013136409 A1 9/2013

*Primary Examiner* — Daniel Kessie
*Assistant Examiner* — Brian K Baxter
(74) *Attorney, Agent, or Firm* — Young Law Firm, P.C.

(57) ABSTRACT

Disclosed herein is a wireless power receiving device that includes a power receiving coil that takes in AC power via a magnetic field, and a rectifier that converts the AC power to DC power and outputs the DC power to a load. The rectifier includes a plurality of diodes bridge-connected to each other, the plurality of diodes including a first diode whose anode is connected to one input terminal of the rectifier and a second diode whose cathode is connected to the one input terminal of the rectifier; a first capacitor connected in parallel with the first diode; and a second capacitor connected in parallel with the second diode. Capacitances $C_1$ and $C_2$ of the first and second capacitor satisfy $C_1 < 1/(2fR_{Lmax})$ and $C_2 < 1/(2fR_{Lmax})$ where a frequency of the AC power is denoted by f, and a maximum resistance value of the load is denoted by $R_{Lmax}$.

7 Claims, 12 Drawing Sheets

(56) References Cited

U.S. PATENT DOCUMENTS

| | | | |
|---|---|---|---|
| 2017/0005532 A1* | 1/2017 | Akuzawa | H02J 50/12 |
| 2017/0174088 A1* | 6/2017 | Muramatsu | H02J 7/025 |
| 2018/0034381 A1* | 2/2018 | Aldhaher | H02M 7/06 |
| 2019/0165611 A1* | 5/2019 | Miyazawa | H02M 3/335 |
| 2019/0190319 A1* | 6/2019 | Kawamae | H02J 50/10 |

* cited by examiner

WIRELESS POWER RECEIVER, WIRELESS POWER TRANSMISSION SYSTEM USING THE SAME, AND RECTIFIER

BACKGROUND OF THE INVENTION

Field of the Invention

The present invention relates to a configuration of a rectifier that converts alternating-current (AC) power to direct-current (DC) power, and is preferably used for a power receiving device of a wireless power transmission system that wirelessly transfers power from a power transmitting side to a power receiving side.

Description of Related Art

There has been known a wireless power transfer technique for wirelessly transferring energy of an AC current provided to a primary coil (power transmitting coil) to a secondary coil (power receiving coil) by using magnetic coupling between the primary coil and the secondary coil disposed opposite to each other.

In the wireless power transfer technique, there is a problem in which power transfer efficiency decreases with a change of impedance caused by a load state. To solve this problem, for example, International Publication No. WO2013/136409 proposes a technique in which impedance of a live part is detected, and if the detected impedance is relatively low, a bridge rectifier circuit is selected, and if the detected impedance has reached a relatively high value, a voltage doubler rectifier circuit is selected to suppress a decrease of power transfer efficiency.

However, according to the technique disclosed in International Publication No. WO2013/136409, hardware such as a switch that switches over the bridge rectifier circuit and the voltage doubler rectifier circuit, a detection unit that detects impedance relating to the live part, and a control circuit that controls on/off of the switch is necessary. Particularly, when power to be handled is large, a large switch is required, thereby causing a problem such as a cost increase and securement of an installation space. Further, in terms of software, an active control algorithm that detects load impedance to control an on/off timing of the switch is required, thereby causing a problem in that the system becomes complicated.

Further, in International Publication No. WO2013/136409, a capacitor connected in parallel with a rectifier diode functions as the voltage doubler rectifier circuit. However, an influence thereof to the rectifier diode that becomes a generation source of harmonics is not taken into consideration at all, and there is still a room for improvement in this regard.

SUMMARY

The present invention has been achieved in view of the above problems, and an object of the present invention is to suppress variation of load impedance as seen from an input side of a rectifier, while decreasing harmonic components without separately providing an impedance converter that requires active control.

To solve the above problems, a wireless power receiving device of the present invention includes a power receiving coil that takes in AC power via a magnetic field; and a rectifier that converts the AC power received by the power receiving coil to DC power and outputs the DC power to a load, wherein the rectifier includes: a plurality of diodes bridge-connected to each other, the plurality of diodes including a first diode whose anode is connected to one input terminal of the rectifier and a second diode whose cathode is connected to the one input terminal of the rectifier; a first capacitor connected in parallel with the first diode; and a second capacitor connected in parallel with the second diode, and wherein capacitance $C_1$ of the first capacitor and capacitance $C_2$ of the second capacitor satisfy $$C_1 < 1/(2fR_{Lmax})$$

$$C_2 < 1/(2fR_{Lmax})$$

where a frequency of the AC power is denoted by f, and a maximum resistance value of the load is denoted by $R_{Lmax}$.

A wireless power transmission system according to the present invention includes a wireless power transmitting device including a power feeding coil and the wireless power receiving device according to the present invention described above that receives power wirelessly transferred from the wireless power transmitting device.

Further, the rectifier according to the present invention is a rectifier that converts input AC power to DC power and outputs the DC power to a load, wherein the rectifier includes a plurality of diodes bridge-connected to each other, the plurality of diodes including a first diode whose anode is connected to one input terminal of the rectifier and a second diode whose cathode is connected to the one input terminal of the rectifier; a first capacitor connected in parallel with the first diode; and a second capacitor connected in parallel with the second diode, wherein capacitance $C_1$ of the first capacitor and capacitance $C_2$ of the second capacitor satisfy $$C_1 < 1/(2fR_{Lmax})$$

$$C_2 < 1/(2fR_{Lmax})$$

where a frequency of the AC power is denoted by f, and a maximum resistance value of the load is denoted by $R_{Lmax}$.

BRIEF DESCRIPTION OF THE DRAWINGS

The above and other objects, features and advantages of this invention will become more apparent by reference to the following detailed description of the invention taken in conjunction with the accompanying drawings, wherein:

FIG. 10A shows a case where the mode switching timing is late (when D is large), FIG. 10B shows a case where the mode switching timing is early (when D is small);

DETAILED DESCRIPTION OF THE EMBODIMENTS

Preferred embodiments of the present invention will now be explained in detail with reference to the drawings.

Figure 1:
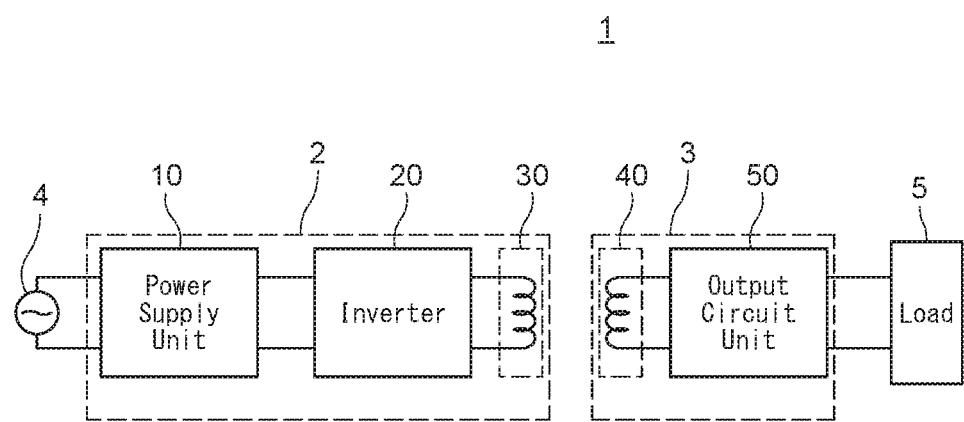
FIG. 1 is a block diagram showing a configuration of a wireless power transmission system according to a first embodiment of the present invention.

FIG. 1 is a block diagram showing a configuration of a wireless power transmission system according to the first embodiment of the present invention.

As shown in FIG. 1, a wireless power transmission system 1 is configured by a combination of a power transmitting device 2 (wireless power transmitting device) and a power receiving device 3 (wireless power receiving device), and wirelessly transfers power from the power transmitting device 2 to the power receiving device 3.

The power transmitting device 2 includes a power supply unit 10 that converts an AC voltage supplied from an AC power supply 4 to a predetermined DC voltage, an inverter 20 that converts the DC voltage output from the power supply unit 10 to an AC voltage (rectangular wave) having a predetermined frequency (for example, 100 kHz), and a power feeding coil 30 that receives the AC voltage to generate a magnetic flux. The configuration of the power supply unit 10 is not particularly limited, and for example, the power supply unit 10 is configured by a power factor improvement circuit (PFC) and a non-insulated DC-DC converter. AC power supplied from the AC power supply 4 is converted to a DC voltage by the PFC, and further converted to a predetermined voltage level by the non-insulated DC-DC converter.

The power receiving device 3 includes a power receiving coil 40 that takes in AC power via a magnetic field generated by the power feeding coil 30, and an output circuit unit 50 including a rectifier that converts the AC power received by the power receiving coil 40 to DC power. An output voltage of the output circuit unit 50 is supplied to a load 5.

Figure 2:
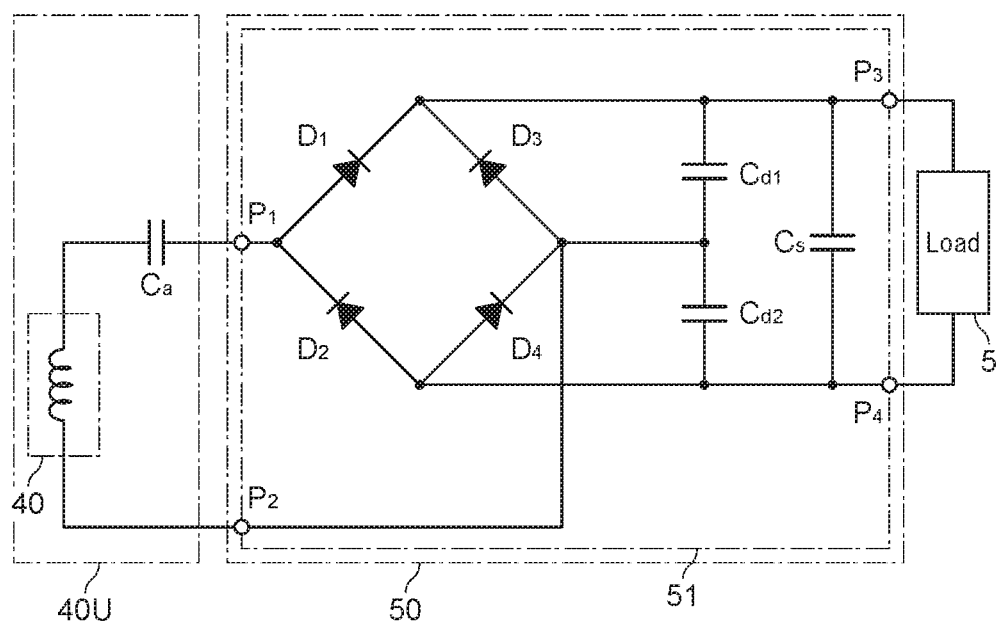
FIG. 2 is a circuit diagram showing a configuration of the power receiving device including a rectifier.

FIG. 2 is a circuit diagram showing a configuration of the power receiving device 3.

As shown in FIG. 2, the power receiving device 3 includes a power receiving coil unit 40U and the output circuit unit 50. The power receiving coil unit 40U constitutes a series resonance circuit including the power receiving coil 40 and a capacitor Ca. The configuration of the reception-side resonance circuit including the power receiving coil 40 is not particularly limited, and the capacitor can be provided in parallel with the power receiving coil 40, or can be provided in series/parallel. It is not essential to provide a capacitor as a mounting component for configuring the reception-side resonance circuit.

The output circuit unit 50 includes a rectifier 51 including a full bridge circuit. The rectifier 51 includes bridge-connected diodes D1 to D4, a first capacitor $C_{d1}$ connected in parallel with the diode D3, a second capacitor $C_{d2}$ connected in parallel with the diode D4, and a smoothing capacitor Cs.

An anode of the diode D1 and a cathode of the diode D2 are connected to an input terminal $P_1$ of the rectifier 51, and an anode of the diode D3 and a cathode of the diode D4 are connected to an input terminal $P_2$ of the rectifier 51. Further, respective cathodes of the diodes D1 and D3 are connected to an output terminal $P_3$ of the rectifier 51, and respective anodes of the diodes D2 and D4 are connected to an output terminal $P_4$ of the rectifier 51. For example, a battery is connected as a load 5 between the pair of output terminals $P_3$ and $P_4$ of the rectifier 51, and is charged by power received by the power receiving device 3.

Figure 3A:
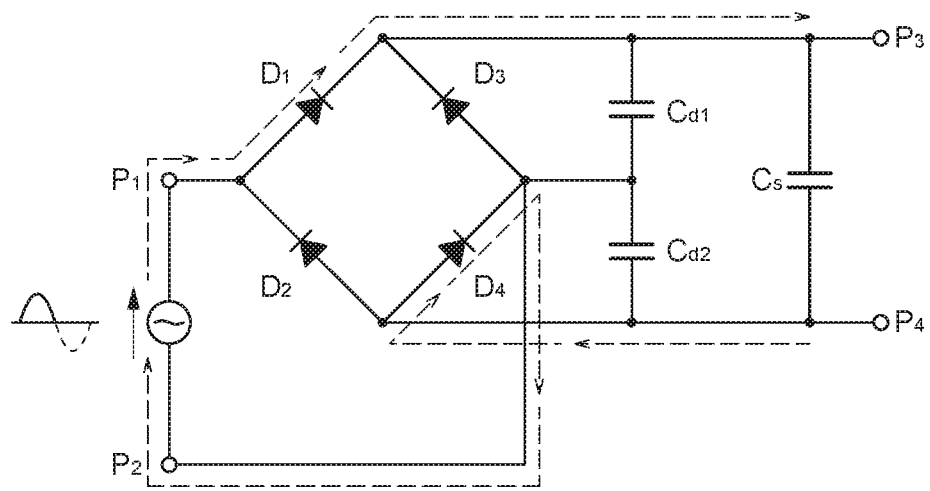
FIGS. 3A and 3B are explanatory diagrams of an operating mode of the rectifier in a bridge rectifier mode.
Figure 3B:
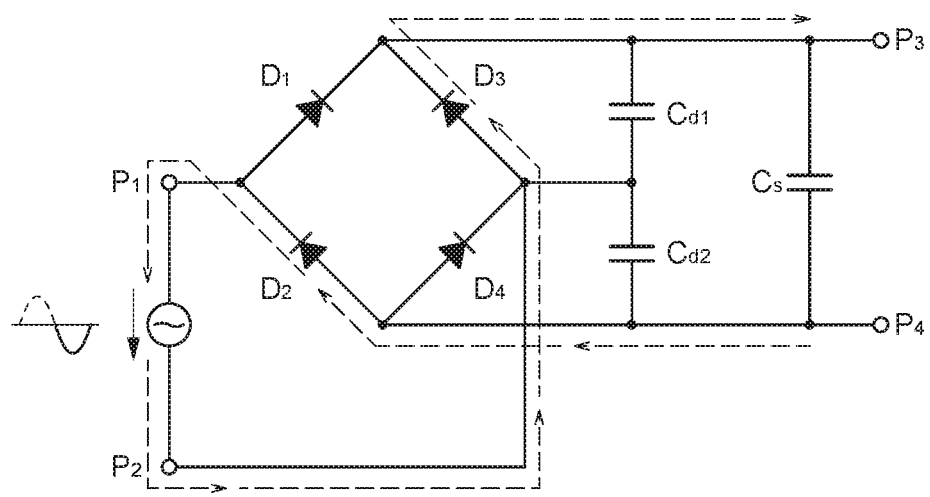
Figure 4A:
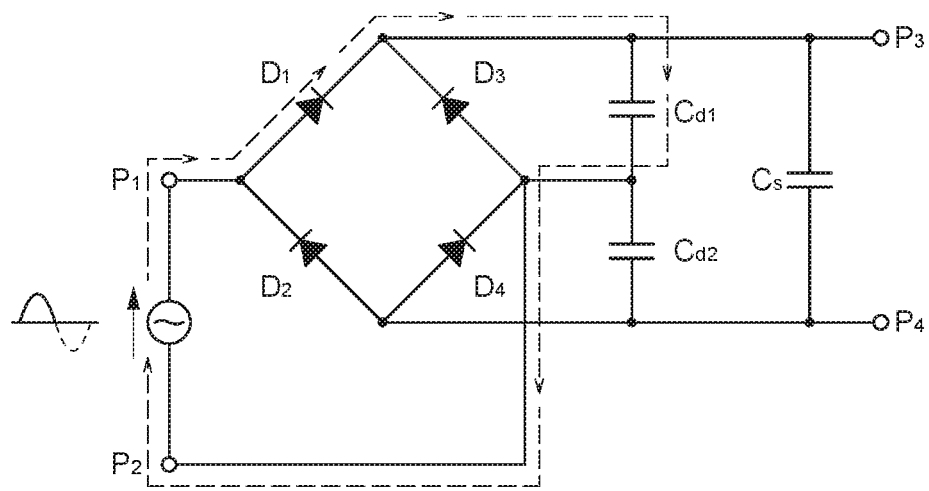
FIGS. 4A and 4B are explanatory diagrams of an operating mode of the rectifier in a voltage doubler rectifier mode.
Figure 4B:
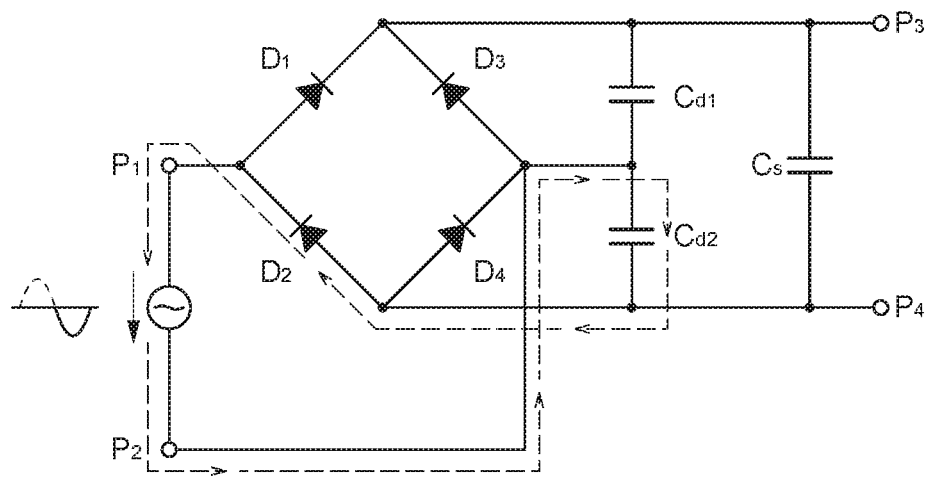

FIGS. 3A and 3B and FIGS. 4A and 4B are explanatory diagrams of an operating mode of the rectifier 51, wherein FIG. 3A and FIG. 3B respectively indicate a bridge rectifier mode, and FIG. 4A and FIG. 4B respectively indicate a voltage doubler rectifier mode.

The diodes D1 to D4 constitute a bridge rectifier circuit. As shown in FIG. 3A, when a voltage is applied in a state with the input terminal $P_1$ of the rectifier 51 being positive and the input terminal $P_2$ being negative, such current flows that the first and fourth diodes D1 and D4 are turned on, and the second and third diodes D2 and D3 are turned off. On the contrary, as shown in FIG. 3B, when a voltage is generated in a state with the input terminal $P_1$ of the rectifier 51 being negative and the input terminal $P_2$ being positive, such current flows that the first and fourth diodes D1 and D4 are turned off, and the second and third diodes D2 and D3 are turned on. Therefore, the rectified voltage between the pair of output terminals $P_3$ and $P_4$ of the rectifier 51 becomes a DC voltage having a maximum value $V_{max}$ of the input AC voltage of the rectifier 51.

The first and second capacitors $C_{d1}$ and $C_{d2}$ constitute a voltage doubler rectifier circuit together with the diodes D1 and D2. When the diodes D1 and D2 are operating as a bridge rectifier circuit together with the diodes D3 and D4, the first and second capacitors $C_{d1}$ and $C_{d2}$ act as harmonic filter elements with respect to the bridge rectifier circuit. It is preferable that the capacitance of the first capacitor $C_{d1}$ and the capacitance of the second capacitor $C_{d2}$ are the equal in order to decrease ripples of the input current to the load 5; however, the capacitance of the first capacitor $C_{d1}$ and the capacitance of the second capacitor $C_{d2}$ may not necessarily be equal.

As shown in FIG. 4A, when a voltage is generated in a state with the input terminal $P_1$ of the rectifier 51 being positive and the input terminal $P_2$ being negative, a current that passes through the first diode D1 and the first capacitor $C_{d1}$ flows, and a DC voltage corresponding to the maximum value $V_{max}$ of the input AC voltage of the rectifier 51 is generated at the opposite ends of the first capacitor $C_{d1}$. On the contrary, when a voltage is generated in a state with the input terminal $P_1$ of the rectifier 51 being negative and the input terminal $P_2$ being positive, a current that passes through the second diode D2 and the second capacitor $C_{d2}$ flows, and a DC voltage corresponding to the maximum value $V_{max}$ of the input AC voltage of the rectifier 51 is generated at the opposite ends of the second capacitor $C_{d2}$.

Therefore, the rectified voltage between the pair of output terminals $P_3$ and $P_4$ of the rectifier 51 becomes a DC voltage having double the value of the maximum value $V_{max}$ of the input AC voltage of the rectifier 51. Thus, the voltage doubler rectifier circuit is a circuit that can acquire a DC output voltage double the value of the bridge rectifier circuit even if the input AC voltage is the same, and the input impedance thereof becomes about half the value of the bridge rectifier circuit.

Respective power transfer efficiencies at the time of charging a battery in a case where only the bridge rectifier circuit is used and in a case where only the voltage doubler rectifier circuit is used will be described with reference to FIG. 5.

Figure 5:
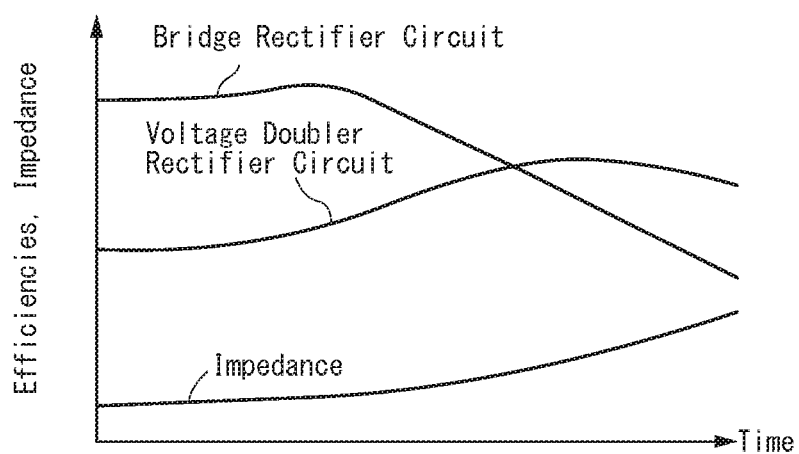
FIG. 5 is a graph showing an example of time variation in power transfer efficiencies of the bridge rectifier circuit and the voltage doubler rectifier circuit.

FIG. 5 is a graph showing an example of time variation in power transfer efficiencies of the bridge rectifier circuit and the voltage doubler rectifier circuit.

As shown in FIG. 5, the power transfer efficiency when only the bridge rectifier circuit is used deteriorates in the latter half of a battery charging period. On the other hand, the power transfer efficiency when only the voltage doubler rectifier circuit is used is initially lower than the case where only the bridge rectifier circuit is used when starting to charge the battery, but becomes higher than the case where only the bridge rectifier circuit is used in the latter half of the battery charging period.

Therefore, in the present embodiment, the both circuits are operated so that the rectification effect by the bridge rectifier circuit is stronger than that by the voltage doubler rectifier circuit when starting to charge a battery where impedance is low, and the rectification effect by the voltage doubler rectifier circuit becomes stronger gradually than that by the bridge rectifier circuit, with an increase of a charged amount.

The rectifier 51 operates in the voltage doubler rectifier mode at the beginning of the half cycle of an input AC voltage, and switches over the operating mode from the voltage doubler rectifier mode to the bridge rectifier mode in the middle of the half cycle. At a timing shifting to the next half cycle, the rectifier 51 switches over the operating mode again from the bridge rectifier mode to the voltage doubler rectifier mode.

As shown in FIGS. 4A and 4B, when the rectifier 51 is operating in the voltage doubler rectifier mode, the diodes D3 and D4 are in an off state. Switchover from the voltage doubler rectifier mode to the bridge rectifier mode is performed by an on operation of the diode D3 or D4. For example, in the positive half cycle of an input AC voltage, a terminal voltage of the second capacitor $C_{d2}$ of the rectifier 51 that operates in the voltage doubler rectifier mode (see FIG. 4A) applies reverse bias to the diode D4. However, when the capacitor $C_{d2}$ is gradually discharged with the voltage doubler rectifying operation to decrease the terminal voltage gradually, and after having been fully discharged, the polarity of the terminal voltage of the capacitor $C_{d2}$ is reversed to start charging and the terminal voltage applies forward bias to the diode D4. Then, the diode D4 is turned on and the rectifier 51 switches over the operating mode from the voltage doubler rectifier mode to the bridge rectifier mode.

The switchover from the bridge rectifier mode to the voltage doubler rectifier mode is performed at a timing when the polarity of the input AC voltage is reversed. At this time, the terminal voltage of the capacitor $C_{d2}$ (or $C_{d1}$) starts to apply reverse bias to the diode D4 (or D3), and hence, the diode D4 (or D3) becomes an off state and the rectifier 51 is switched over to the voltage doubler rectifier mode.

The switchover from the voltage doubler rectifier mode to the bridge rectifier mode is affected by the magnitude of the capacitance of the capacitors $C_{d1}$ and $C_{d2}$. If the capacity is large, a time constant increases, and hence, the capacitors $C_{d1}$ and $C_{d2}$ cannot be fully discharged within the period of the half cycle of the input AC voltage. However, by decreasing the capacity, the capacitors $C_{d1}$ and $C_{d2}$ can be fully discharged within the period of the half cycle of the input AC voltage and can be charged up to a voltage at which the diodes D3 and D4 are turned on.

This means that as the capacities of the first and second capacitors $C_{d1}$ and $C_{d2}$ increase, a switching timing from the voltage doubler rectifier mode to the bridge rectifier mode is delayed, and on the contrary, as the capacities decrease, the timing is hastened. That is, when the capacities of the first and second capacitors $C_{d1}$ and $C_{d2}$ are large, an operating ratio in the voltage doubler rectifier mode becomes higher than that in the bridge rectifier mode, and when the capacities are small, the operating ratio in the bridge rectifier mode becomes higher than that in the voltage doubler rectifier mode.

When the frequency of the input AC power is denoted by f and the maximum value of load impedance of a battery is denoted by $R_{Lmax}$, it is necessary that the capacitance $C_1$ of the first capacitor $C_{d1}$ and the capacitance $C_2$ of the second capacitor $C_{d2}$ are respectively smaller than $1/(2fR_{Lmax})$ (that is, to satisfy $C_1$, $C_2 < 1/(2fR_{Lmax})$. In the case of having such capacitance, even if load impedance is maximum, the time ratio of the voltage doubler rectifier mode with respect to the bridge rectifier mode can be set to be less than 100%, and the rectifying operation by the bridge rectifier circuit can be performed at all times within a variation range of the load impedance.

Further, it is preferable that the capacitance $C_1$ of the first capacitor $C_{d1}$ and the capacitance $C_2$ of the second capacitor $C_{d2}$ are respectively larger than $1/(80 \times 2fR_{Lmax})$ (that is, to satisfy $C_1$, $C_2 > 1/(80 \times 2fR_{Lmax})$. In the case of having such capacitance, the upper limit of the time ratio of the voltage doubler rectifier mode with respect to the bridge rectifier mode of the rectifier 51 can be increased to 10% or more. Therefore, the two modes can be operated at an appropriate time ratio within the variation range of the load impedance, and a suppression effect of variation of load impedance can be further increased.

When the load 5 is a battery, a rectifying operation ratio of the bridge rectifier circuit becomes highest at the time of starting charging, and as the battery charge gradually proceeds to increase the load impedance gradually, the rectifying operation ratio of the bridge rectifier circuit gradually decreases, and conversely, the rectifying operation ratio of the voltage doubler rectifier circuit gradually increases. At the time of completion of the battery charge when the load impedance becomes maximum, the rectifying operation ratio of the bridge rectifier circuit becomes lowest, and the rectifying operation by the voltage doubler rectifier circuit becomes dominant. Therefore, variation of load impedance as seen from an input side of the rectifier 51 can be suppressed without separately providing an impedance converter that requires active control.

Figure 6:
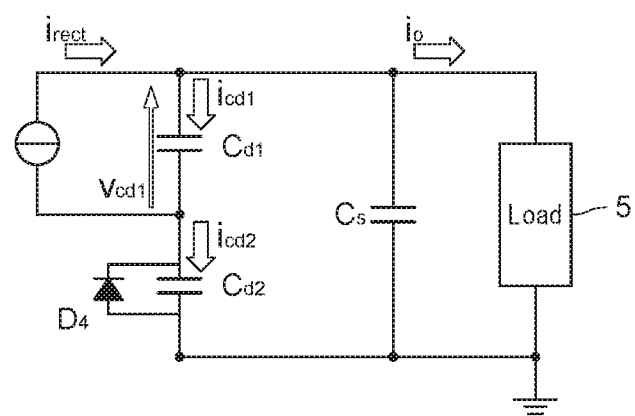
FIG. 6 is an equivalent circuit diagram of the rectifier.
Figure 7:
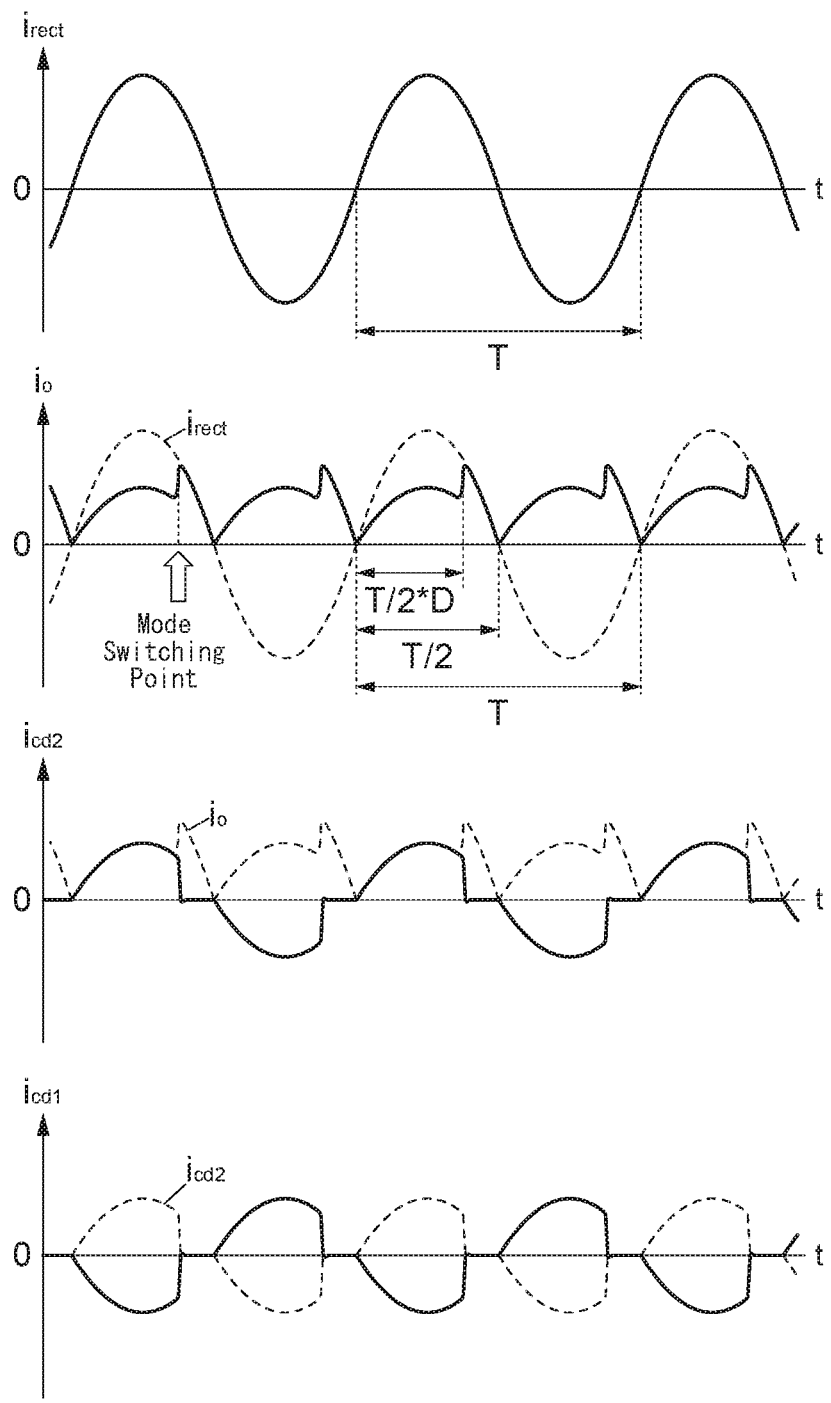
FIG. 7 is a waveform chart showing an input/output current of the rectifier.

FIG. 6 is an equivalent circuit diagram of the rectifier 51.
FIG. 7 is a waveform chart showing an input/output current of the rectifier 51.

As shown in FIG. 6 and FIG. 7, when an input current $i_{rect}$ of the rectifier 51 is a sine wave, an output current io of the rectifier 51 is not a general bridge rectifier waveform, but becomes a waveform that changes in a discontinuous manner.

When the output current io of the rectifier 51 is superimposed on the input current $i_{rect}$ and a current $-i_{cd2}$ flowing to the second capacitor $C_{d2}$, it is seen that the output current io is always equal to either one of the two currents, and the mode is switched over in the middle. That is, the output current io is equal to the current $-i_{cd2}$ before a mode switching point and equal to the input current $i_{rect}$ after the mode switching point. Further, a current $i_{cd1}$ flowing to the first capacitor $C_{d1}$ and a current $i_{cd2}$ flowing to the second capacitor $C_{d2}$ have the same size and a reverse-sign relation ($i_{cd1}=-i_{cd2}$). Therefore, it is seen that the rectifier 51 operates in the voltage doubler rectifier mode in a first half of the half cycle with the mode switching point being a boundary, and operates in the bridge rectifier mode in the latter half of the half cycle. When respective currents are defined by an orientation of arrows in FIG. 6, a relation between the current $i_{rect}$ and the currents $i_{cd1}$ and $i_{cd2}$ in the voltage doubler rectifier mode becomes $i_{rect}=i_{cd1}-i_{cd2}=2i_{cd1}$.

Figure 8A:
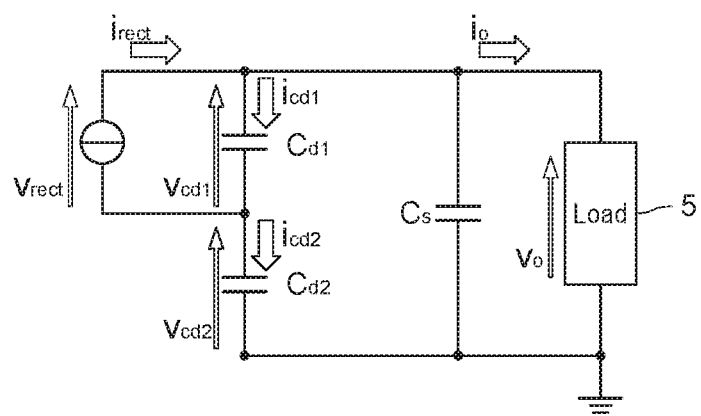
FIG. 8A is an equivalent circuit diagram in the bridge rectifier mode.
Figure 8B:
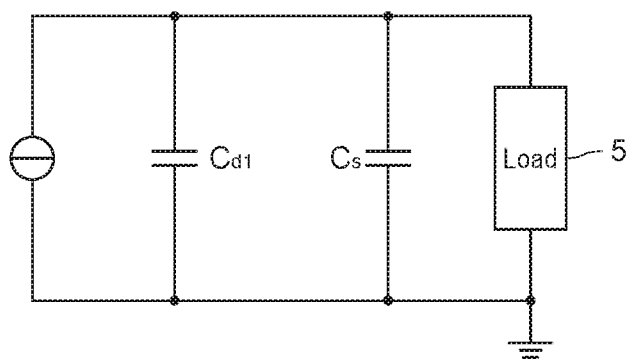
FIG. 8B is an equivalent circuit diagram in the voltage doubler rectifier mode.

The switchover of the two modes is caused by the on operation of the diode D4 connected in parallel with the second capacitor $C_{d2}$. That is, when the fourth diode D4 is turned off, the rectifier 51 operates in the voltage doubler rectifier mode, and an equivalent circuit of the voltage doubler rectifier circuit becomes as shown in FIG. 8A. When the diode D4 is turned on, the rectifier 51 operates in the bridge rectifier mode, and an equivalent circuit of the bridge rectifier circuit becomes as shown in FIG. 8B.

Figure 9:
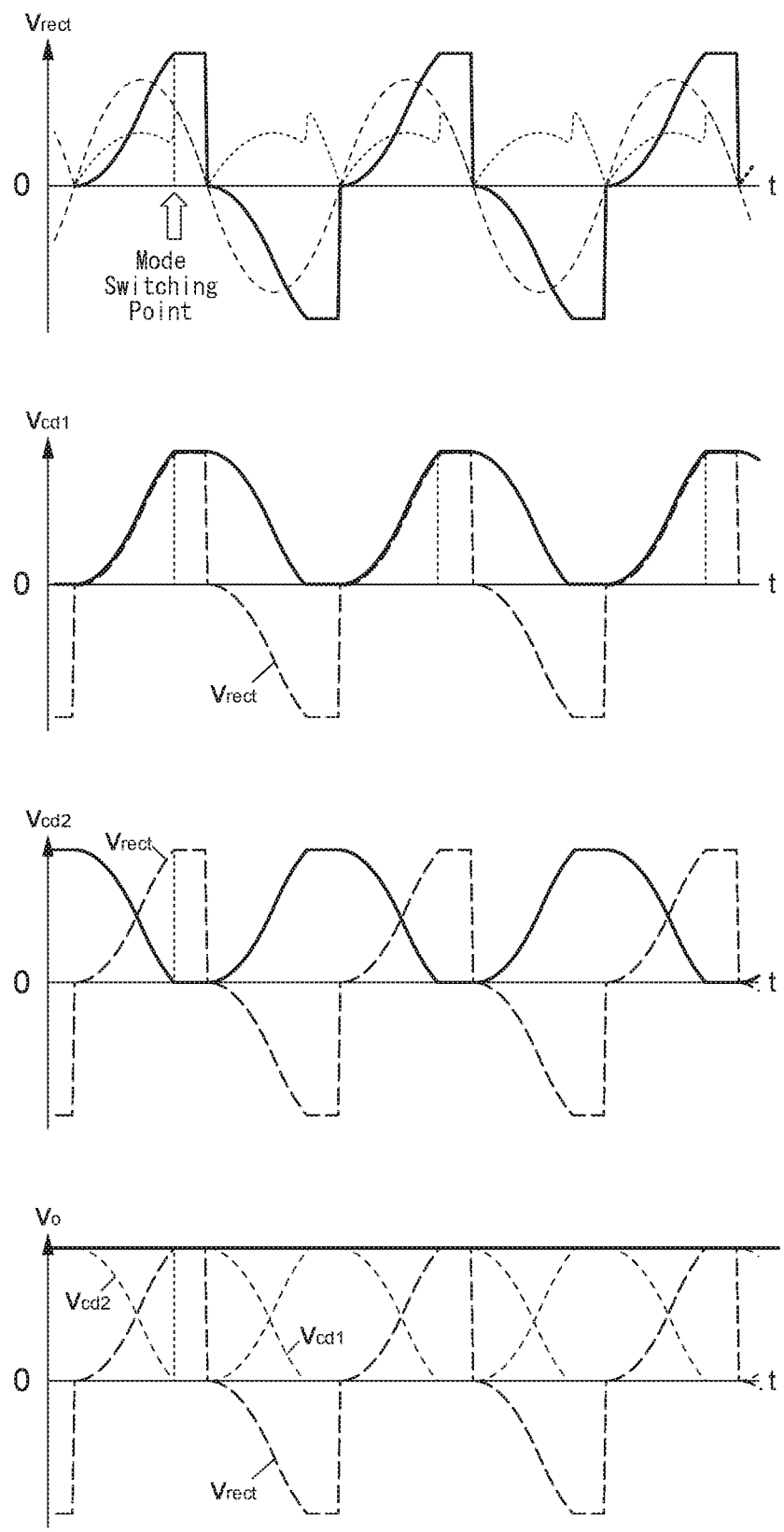
FIG. 9 is a waveform chart showing an input voltage of the rectifier.

An input voltage $V_{rect}$ with respect to the input current $i_{rect}$ of the sine wave of the rectifier 51 becomes a distorted waveform as shown in FIG. 9. When the terminal voltages of the first and second capacitors $C_{d1}$ and $C_{d2}$ are respectively denoted by $V_{cd1}$ and $V_{cd2}$ the input voltage $V_{rect}$ is $v_{cd1}$ or $v_{cd2}$ of positive and negative half-waves. When the respective voltages are defined by the orientation of the arrows in FIG. 8A, the relation between an output voltage $V_o$ and the respective terminal voltages $v_{cd1}$ and $v_{cd2}$ of the capacitors $C_{d1}$ and $C_{d2}$ becomes $v_{cd1}+v_{cd2}=V_o$ (constant).

The switching point of the two modes is a point where the terminal voltage of one of the capacitors constituting the rectifier 51 becomes zero, and at this time, the terminal voltage of the other capacitor becomes equal to the output voltage $V_o$ (DC voltage). That is, $v_{cd1}$ (t=0)=0, $v_{cd1}$ (t=$t_d$)=$V_o$ ($t_d$: switching time).

Figure 10A:
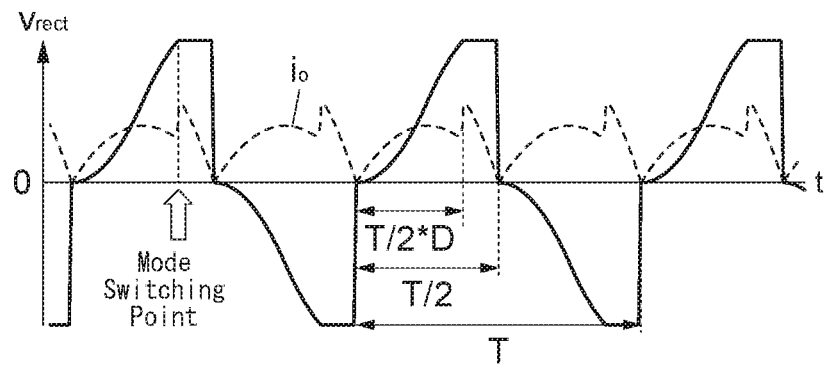
FIGS. 10A and 10B are explanatory diagrams showing a difference of a mode switching point D, where
Figure 10B:
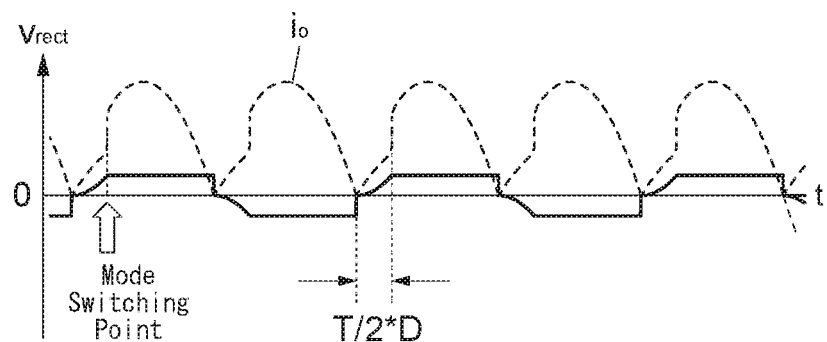

FIGS. 10A and 10B are explanatory diagrams showing a difference of a mode switching point D.

As shown in FIG. 10A, when the mode switching timing is late (when D is large), the influence of the voltage doubler rectifier operation increases, and hence, the input voltage $V_{rect}$ increases. On the other hand, when the mode switching timing is early (when D is small) as shown in FIG. 10B, the influence of the bridge rectifier operation increases, and hence, even if the size of the input current $i_{rect}$ is the same, the input voltage $V_{rect}$ decreases. This means that as the mode switching timing becomes later, the input impedance decreases due to the influence of the voltage doubler rectifier mode. On the contrary, this means that as the mode switching timing becomes earlier, the input impedance does not decrease due to the influence of the bridge rectifier mode.

Next, derivation of the mode switching point D will be described.

When the mode switching point is denoted by D:[0, 1], taking into consideration the half cycle from t=0 to t=T/2, the time [μs] of the switching point becomes TD/2 [μs].

Based on the following conditional equations, the mode switching point D is obtained.

$$i_{cd2}=-i_{cd1}$$

$$i_{rect}=i_{cd1}-i_{cd2}=2i_{cd1}$$

$$v_{cd1}+v_{cd2}=V_o \text{ (constant)}$$

$$v_{cd1}(t=0)=0, v_{cd1}(t=TD/2)=V_o$$

Next, when $v_{cd1}$ is calculated, the following expression is obtained.

Expression 1

$$v_{cd1}(t) = \frac{1}{C_d}\int i_{cd1}(t)dt = \frac{|i_{rect}|}{2C_d}\int \sin\omega t\, dt = -\frac{|i_{rect}|}{2\omega C_d}\cos\omega t + C$$

From initial condition, $$v_{cd1}(0) = -\frac{|i_{rect}|}{2\omega C_d} + C = 0$$

$$\therefore C = \frac{|i_{rect}|}{2\omega C_d}$$

$$\therefore v_{cd1}(t) = \frac{|i_{rect}|}{2\omega C_d}(1 - \cos\omega t)$$

From final value condition of mode, $$v_{cd1}\left(\frac{T}{2}D\right) = \frac{|i_{rect}|}{2\omega C_d}(1 - \cos\pi D) = V_o = R_L I_o \quad \because \omega = \frac{2\pi}{T}$$

Next, when Io (a mean value of io (DC value)) is calculated, the following expression is obtained.

Expression 2

$$I_O = \frac{1}{T/2}\left(\int_0^{\frac{T}{2}D} i_{cd1}(t)dt + \int_{\frac{T}{2}D}^{\frac{T}{2}} i_{rect}(t)dt\right)$$

$$= \frac{2}{T}|i_{rect}|\left(\frac{1}{2}\int_0^{\frac{T}{2}D}\sin\omega t\, dt + \int_{\frac{T}{2}D}^{\frac{T}{2}}\sin\omega t\, dt\right)$$

$$= \frac{2}{T}|i_{rect}|\frac{1}{\omega}\left(-\frac{1}{2}[\cos\omega t]_0^{\frac{T}{2}D} - [\cos\omega t]_{\frac{T}{2}D}^{\frac{T}{2}}\right)$$

$$= \frac{|i_{rect}|}{\pi}\left(\frac{1}{2}\cos\pi D + \frac{3}{2}\right)$$

$$\therefore I_O = \frac{|i_{rect}|}{2\pi}(\cos\pi D + 3)$$

Next, when $v_{cd1}$ and Io are made simultaneous, the following expression is obtained.

Expression 3

$$\frac{|i_{rect}|}{2\omega C_d}(1 - \cos\pi D) = R_L \frac{|i_{rect}|}{2\pi}(\cos\pi D + 3)$$

$$\left(\frac{\pi}{\omega C_d R_L} + 1\right)\cos\pi D = \frac{\pi}{\omega C_d R_L} - 3$$

$$\therefore D = \frac{1}{\pi}\cos^{-1}\left(\frac{\frac{\pi}{\omega C_d R_L} - 3}{\frac{\pi}{\omega C_d R_L} + 1}\right)$$

Here, because a domain of definition in the bracket of the Expression 3 is [−1, 1], it is seen that it is necessary to satisfy $\pi/(\omega C_d R_L)>1$ and $R_L<\pi/(\omega C_d)$. This defines the range of the load impedance $R_L$ to which this calculation can be applied.

To satisfy D<1 when the load impedance $R_L$ is maximum ($R_L=R_{Lmax}$) as described above, it is necessary that $R_{Lmax}<\pi/(\omega C_d)$. In other words, it is necessary to satisfy $R_{Lmax}<1/(2fC_d)$, and that the capacitance $C_1$ of the first capacitor $C_{d1}$ and the capacitance $C_2$ of the second capacitor $C_{d2}$ are smaller than $1/(2fR_{Lmax})$. Based on the calculation described above, it is seen that $C_1$, $C_2<1/(2fR_{Lmax})$ needs only to be satisfied in order to satisfy D<1 when the load impedance $R_L$ is maximum ($R_L=R_{Lmax}$).

Figure 11:
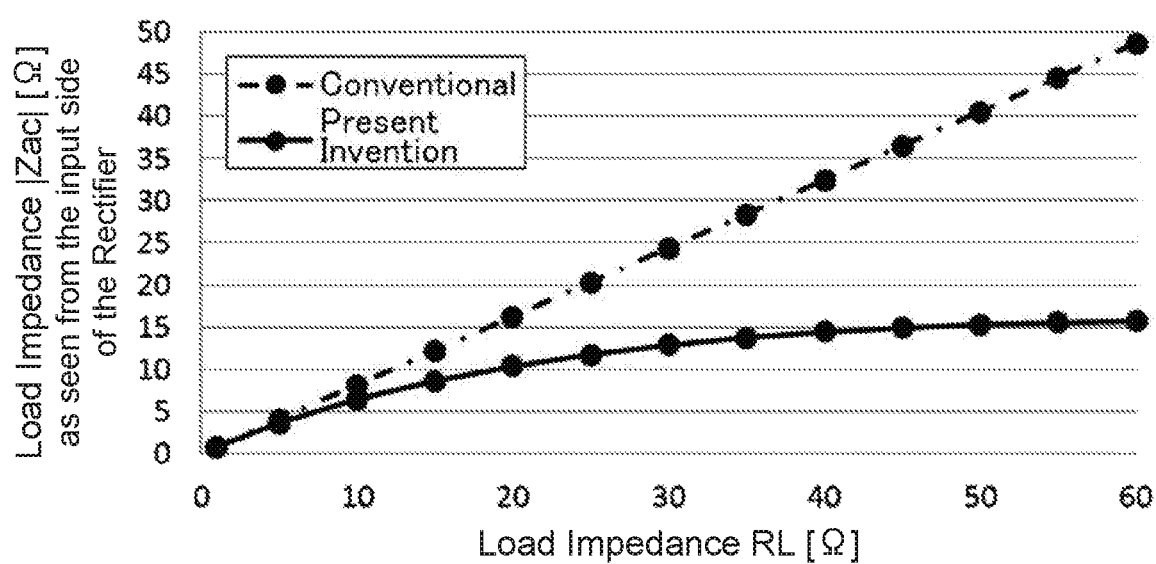
FIG. 11 is a graph showing a relation between load impedance as seen from an input side of the rectifier and the actual load impedance.

FIG. 11 is a graph showing a relation between load impedance $|Z_{ac}|$ as seen from an input side of the rectifier 51 and the actual load impedance $R_L$.

As shown in FIG. 11, in a case of a conventional bridge rectifier, load impedance as seen from an input side of the rectifier 51 changes in proportion to the actual load impedance $R_L$. That is, when the actual load impedance $R_L$ increases for example from about 0Ω to about 60Ω, the load impedance $|Z_{ac}|$ as seen from the input side of the rectifier 51 increases from about 0Ω to about 50Ω.

On the other hand, in a case of the rectifier 51 according to the present embodiment, the load impedance $|Z_{ac}|$ as seen from the input side of the rectifier 51 has a smaller change than the actual load impedance $R_L$. That is, even if the actual load impedance $R_L$ increases from about 0Ω to about 60Ω, the load impedance $|Z_{ac}|$ as seen from the input side of the rectifier 51 increases only from about 0Ω to about 15Ω. This means that variation of load impedance on the side of the power receiving device 3 as seen from the side of the power transmitting device 2 is suppressed by the rectifier 51 in the wireless power transmission system. Therefore, a decrease of power transfer efficiency due to impedance mismatch between the side of the power transmitting device 2 and the side of the power receiving device 3 can be suppressed.

Figure 12:
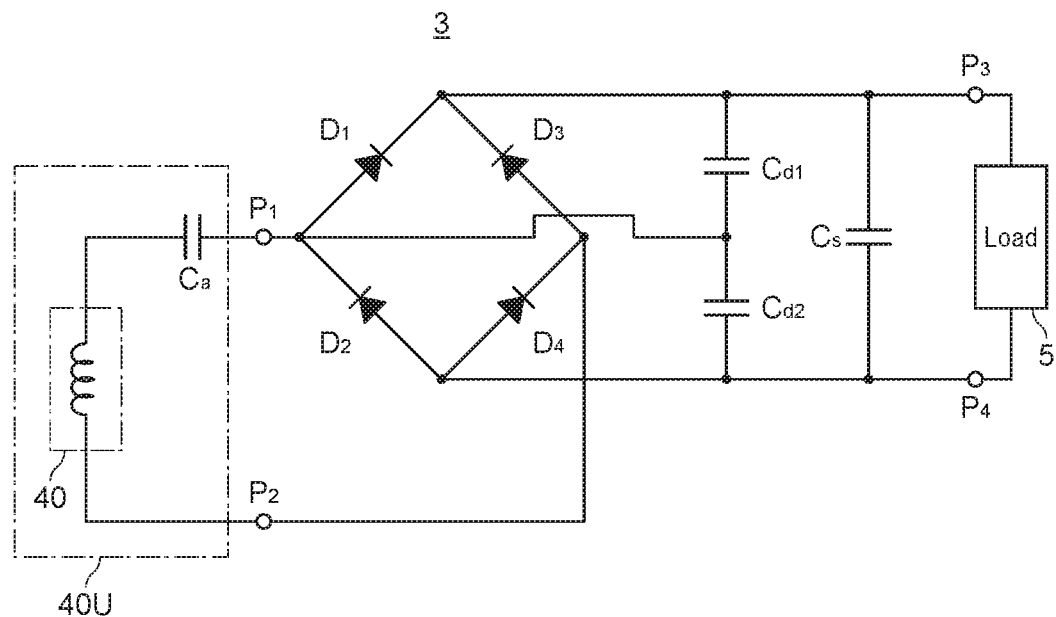
FIG. 12 is a circuit diagram showing a configuration of a power receiving device according to a second embodiment of the present invention.

FIG. 12 is a circuit diagram showing a configuration of a power receiving device according to the second embodiment.

As shown in FIG. 12, the power receiving device 3 is characterized in that the first capacitor $C_{d1}$ is connected in parallel with the diode D1, and the second capacitor $C_{d2}$ is connected in parallel with the diode D2. Thus, the first capacitor $C_{d1}$ needs only to be connected in parallel with a diode, whose anode is connected to one input terminal $P_1$ of the rectifier 51, of the plurality of diodes D1 to D4 configuring a bridge circuit, and the second capacitor $C_{d2}$ needs only to be connected in parallel with a diode, whose cathode is connected to the one input terminal $P_1$ of the rectifier 51. Even with this configuration, identical effects as those of the first embodiment can be attained.

Figure 13:
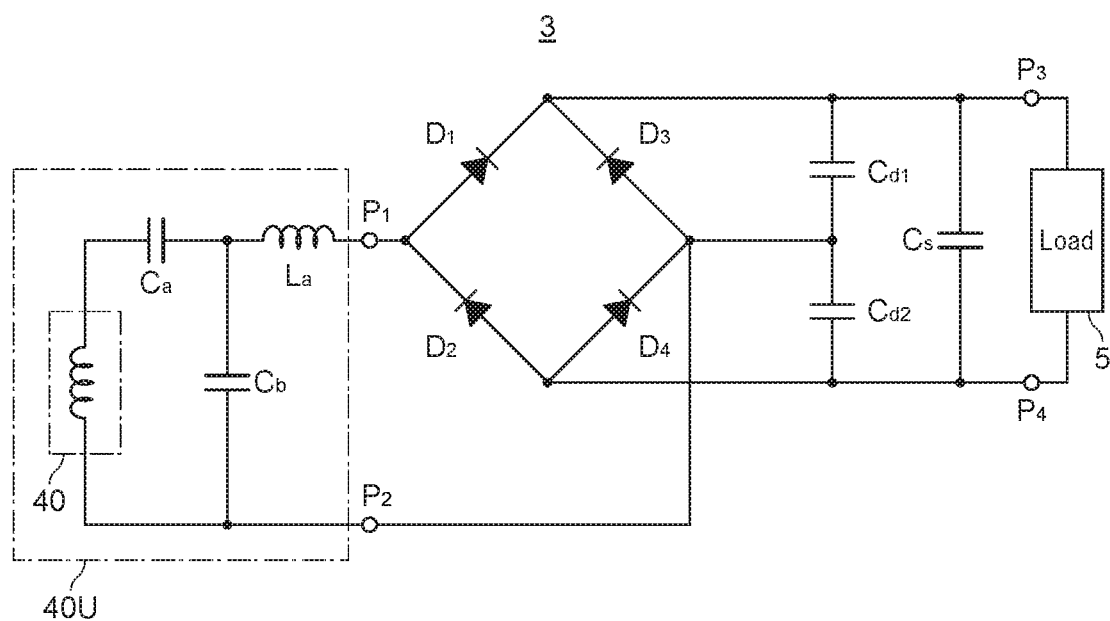
FIG. 13 is a circuit diagram showing a configuration of a power receiving device according to a third embodiment of the present invention.

FIG. 13 is a circuit diagram showing a configuration of a power receiving device according to the third embodiment.

As shown in FIG. 13, the power receiving device 3 is characterized in that not only a series capacitor Ca is serially inserted, but also a series coil La and a parallel capacitor Cb are further inserted between the power receiving coil 40 and the bridge rectifier circuit. Thus, the configuration of an LC resonance circuit including the power receiving coil 40 is not particularly limited, and various circuit configurations can be adopted.

As described above, the wireless power transmission system 1 according to the first to third embodiments include the power transmitting device 2 that wirelessly supplies power, and the power receiving device 3 that receives power wirelessly supplied from the power transmitting device 2. The power receiving device 3 includes the power receiving coil 40 that takes in AC power via a magnetic field, and the rectifier 51 that converts the AC power received by the power receiving coil 40 to DC power and outputs the DC power to the load 5. The rectifier 51 includes the plurality of diodes D1 to D4 bridge-connected to each other, the first capacitor $C_{d1}$ connected in parallel with the diode D3 (or D1), of the diodes D1 to D4, whose anode is connected to one of the input terminals of the rectifier 51, and the second capacitor $C_{d2}$ connected in parallel with the diode whose cathode is connected to the one input terminal of the rectifier 51. Therefore, the rectifier 51 can be operated as a bridge rectifier circuit or a voltage doubler rectifier circuit. The time ratio between a bridge rectifier mode and a voltage doubler rectifier mode of the rectifier 51 can be passively changed depending on variation of impedance of a load connected to an output of the rectifier 51. Therefore, variation of impedance of the load 5 as seen from an input side of the rectifier 51 can be suppressed without separately providing an impedance converter that requires active control, and a decrease of power transfer efficiency due to variation of load impedance can be suppressed.

Further, according to the wireless power transmission system 1 of the first to third embodiments, when the capacitance of the first capacitor $C_{d1}$ is denoted by $C_1$, the capacitance of the second capacitor $C_{d2}$ is denoted by $C_2$, the frequency of AC power is denoted by f, and the maximum resistance value of the load 5 is denoted by $R_{Lmax}$, the capacitance $C_1$ of the first capacitor $C_{d1}$ and the capacitance $C_2$ of the second capacitor $C_{d2}$ are smaller than $1/(2fR_{Lmax})$. Therefore, during the half cycle of the AC power input to the rectifier 51, an upper limit of the time ratio of the voltage doubler rectifier mode with respect to the bridge rectifier mode of the rectifier 51 can be set to be less than 100%. Accordingly, the two modes can be operated with an appropriate time ratio within a variation range of the impedance of the load 5. As a result, variation of load impedance can be suppressed.

It is apparent that the present invention is not limited to the above embodiments, but may be modified and changed without departing from the scope and spirit of the invention.

For example, in the embodiments described above, a battery has been mentioned as the load 5. However, the present invention is not limited to this case, and various loads in which the impedance may vary can be also adopted. Further, in the present invention, a rectifier adopted on the power receiving device side of the wireless power transmission system has been described as an example. However, the application of the rectifier is not limited to the wireless power transfer technique, and the rectifier can be used for various applications.

As described above, according to the present embodiment, there is provided a wireless power receiving device that includes a power receiving coil that takes in AC power via a magnetic field; and a rectifier that converts the AC power received by the power receiving coil to DC power and outputs the DC power to a load, wherein the rectifier includes: a plurality of diodes bridge-connected to each other, the plurality of diodes including a first diode whose anode is connected to one input terminal of the rectifier and a second diode whose cathode is connected to the one input terminal of the rectifier; a first capacitor connected in parallel with the first diode; and a second capacitor connected in parallel with the second diode, and wherein capacitance $C_1$ of the first capacitor and capacitance $C_2$ of the second capacitor satisfy $C_1 < 1/(2fR_{Lmax})$ $C_2 < 1/(2fR_{Lmax})$ where a frequency of the AC power is denoted by f, and a maximum resistance value of the load is denoted by $R_{Lmax}$.

According to the present embodiment, the rectifier can be operated as a bridge rectifier circuit or a voltage doubler rectifier circuit, and a time ratio between a bridge rectifier mode in which the rectifier operates as the bridge rectifier circuit and a voltage doubler rectifier mode in which the rectifier operates as the voltage doubler rectifier circuit can be passively changed depending on variation of impedance if a load connected to an output of the rectifier. That is, when the load impedance is low, an operating period in the bridge rectifier mode can be extended, and when the load impedance is high, an operating period in the voltage doubler rectifier mode can be extended. Therefore, variation of load impedance as seen from an input side of the rectifier can be suppressed.

Further, according to the present embodiment, an upper limit of the time ratio of the voltage doubler rectifier mode with respect to a half cycle of AC power input to the rectifier can be set to be less than 100%. Therefore, the two modes can be operated at an appropriate time ratio within a variation range of the load impedance, thereby enabling to suppress variation of load impedance. Further, by setting the capacitor connected in parallel with the diode to an appropriate capacity, the capacitor can have a role as a harmonic filter.

In the present embodiment, it is preferable that both the capacitance $C_1$ of the first capacitor and the capacitance $C_2$ of the second capacitor satisfy $$1/(80\times 2fR_{Lmax})<C_1$$

$$1/(80\times 2fR_{Lmax})<C_2.$$

According to this configuration, an upper limit of the time ratio of the voltage doubler rectifier mode with respect to the half cycle of AC power input to the rectifier can be set to be higher than 10%. Therefore, the two modes can be operated at an appropriate time ratio within a variation range of load impedance, thereby enabling to further suppress variation of load impedance.

In the present embodiment, it is preferable that the capacitance $C_1$ of the first capacitor and the capacitance $C_2$ of the second capacitor are substantially equal. With this configuration, waveforms of an output current before and after polarity inversion of the input current of the rectifier can be made substantially symmetrical to each other. As a result, ripples of an input current to a load can be decreased.

According to the present embodiment, it is possible to provide a rectifier that can suppress variation of load impedance as seen from an input side of the rectifier, while decreasing harmonic components without separately providing an impedance converter that requires active control, a wireless power receiving device using the rectifier, and a wireless power transmission system.

What is claimed is:

1. A wireless power receiving device comprising:
    a power receiving coil that takes in AC power via a magnetic field; and
    a rectifier that is configured to convert the AC power received by the power receiving coil to DC power by switching between a bridge rectifier mode and a voltage doubler mode and to output the DC power to a load,
    the rectifier comprising
        a plurality of diodes bridge-connected to each other, the plurality of diodes including a first diode whose anode is connected to one input terminal of the rectifier and a second diode whose cathode is connected to the one input terminal of the rectifier;
        a first capacitor connected in parallel with the first diode; and
        a second capacitor connected in parallel with the second diode,
    wherein a capacitance $C_1$ of the first capacitor and a capacitance and capacitance $C_2$ of the second capacitor satisfy $$C_1<1/(2fR_{Lmax})$$

$$C_2<1/(2fR_{Lmax})$$

where a frequency of the AC power is denoted by f, and a maximum resistance value of the load is denoted by $R_{Lmax}$, and wherein a mode switching cycle between the bridge rectifier mode and the voltage doubler rectifier mode is a half cycle of the AC power.

2. The wireless power receiving device as claimed in claim 1, wherein the capacitance $C_1$ of the first capacitor and the capacitance $C_2$ of the second capacitor satisfy $$1/(80\times 2fR_{Lmax})<C_1$$

$$1/(80\times 2fR_{Lmax})<C_2.$$

3. The wireless power receiving device as claimed in claim 1, wherein the capacitance $C_1$ of the first capacitor and the capacitance $C_2$ of the second capacitor are substantially equal.

4. A wireless power transmission system comprising:
    a wireless power transmitting device including a power feeding coil; and
    a wireless power receiving device that receives power wirelessly transferred from the wireless power transmitting device,
    the wireless power receiving device comprising
        a power receiving coil that takes in AC power via a magnetic field; and
        a rectifier that is configured to convert the AC power received by the power receiving coil to DC power by switching between a bridge rectifier mode and a voltage doubler mode and to output the DC power to a load,
    the rectifier comprising
        a plurality of diodes bridge-connected to each other, the plurality of diodes including a first diode whose anode is connected to one input terminal of the rectifier and a second diode whose cathode is connected to the one input terminal of the rectifier;
        a first capacitor connected in parallel with the first diode; and
        a second capacitor connected in parallel with the second diode,
    wherein a capacitance $C_1$ of the first capacitor and a capacitance $C_2$ of the second capacitor satisfy $$C_1<1/(2fR_{Lmax})$$

$$C_2<1/(2fR_{Lmax})$$

where a frequency of the AC power is denoted by f, and a maximum resistance value of the load is denoted by $R_{Lmax}$, and wherein a mode switching cycle between the bridge rectifier mode and the voltage doubler rectifier mode is a half cycle of the AC power.

5. A rectifier that converts input AC power to DC power by switching between a bridge rectifier mode and a voltage doubler mode and that outputs the DC power to a load, the rectifier comprising:
    a plurality of diodes bridge-connected to each other, the plurality of diodes including a first diode whose anode is connected to one input terminal of the rectifier and a second diode whose cathode is connected to the one input terminal of the rectifier;

a first capacitor connected in parallel with the first diode; and a second capacitor connected in parallel with the second diode, wherein a capacitance $C_1$ of the first capacitor and a capacitance $C_2$ of the second capacitor satisfy $$C_1 < 1/(2fR_{Lmax})$$

$$C_2 < 1/(2fR_{Lmax})$$

where a frequency of the AC power is denoted by f, and a maximum resistance value of the load is denoted by $R_{Lmax}$, and wherein a mode switching cycle between the bridge rectifier mode and the voltage doubler rectifier mode is a half cycle of the AC power.

6. The rectifier as claimed in claim 5, wherein the capacitance $C_1$ of the first capacitor and the capacitance $C_2$ of the second capacitor satisfy $$1/(80 \times 2fR_{Lmax}) < C_1$$

$$1/(80 \times 2fR_{Lmax}) < C_2.$$

7. The rectifier as claimed in claim 5, wherein the capacitance $C_1$ of the first capacitor and the capacitance $C_2$ of the second capacitor are substantially equal.

* * * * *